United States Patent
Nair et al.

(10) Patent No.: US 10,831,669 B2
(45) Date of Patent: Nov. 10, 2020

(54) SYSTEMS, METHODS AND COMPUTER PROGRAM PRODUCTS USING MULTI-TAG STORAGE FOR EFFICIENT DATA COMPRESSION IN CACHES

(71) Applicant: International Business Machines Corporation, Armonk, NY (US)

(72) Inventors: Prashant Jayaprakash Nair, Elmsford, NY (US); Seokin Hong, Chappaqua, NY (US); Alper Buyuktosunoglu, White Plains, NY (US); Michael B. Healy, Cortlandt Manor, NY (US); Bulent Abali, Tenafly, NJ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/208,037

(22) Filed: Dec. 3, 2018

(65) Prior Publication Data
US 2020/0174939 A1    Jun. 4, 2020

(51) Int. Cl.
*G06F 12/08* (2016.01)
*G06F 3/06* (2006.01)
(Continued)

(52) U.S. Cl.
CPC ........ *G06F 12/0895* (2013.01); *G06F 3/0604* (2013.01); *G06F 3/0638* (2013.01); *G06F 3/0685* (2013.01); *G06F 12/0864* (2013.01)

(58) Field of Classification Search
CPC ............ G06F 12/0895; G06F 12/0864; G06F 3/0604; G06F 3/0638
See application file for complete search history.

(56) References Cited

U.S. PATENT DOCUMENTS 6,549,210 B1    4/2003  Van Hook et al.
9,367,454 B2 *  6/2016  Svendsen ............ G06F 12/0802
(Continued)

OTHER PUBLICATIONS

Sardashti et al, "Skewed Compressed Caches," 2014 47th Annual IEEE/ACM International Symposium on Microarchitecture, Dec. 13-17, 2014, Cambridge, UK, pp. 331-342.*
(Continued)

*Primary Examiner* — Glenn Gossage
(74) *Attorney, Agent, or Firm* — Amin, Turocy & Watson, LLP

(57) ABSTRACT

Systems, methods and computer program products using multi-tag storage to enable efficient data compression in caches without increasing a tag/data area overhead. One method can comprise storing compressed versions of data elements in a data array of a cache, with tags for the compressed versions respectively appended to the compressed versions as stored in the data array, and storing hashed versions of the tags in a tag array of the cache, wherein the hashed versions of the tags respectively have fewer bits than the tags. A tag block may store hashed versions of tags corresponding to first and second compressed data elements stored in a cacheline of the cache. Hashed tag entries may be compared with full versions of the tags appended to compressed versions of data elements stored in the data array to prevent false positive cache reads. A compressed identifier (CID) may be stored with the hashed versions of tags in the tag array. Full versions of tags may be stored in the tag array for decompressed data stored in the data array of the cache.

20 Claims, 12 Drawing Sheets

(51) Int. Cl.
G06F 12/0895 (2016.01)
G06F 12/0864 (2016.01)

(56) References Cited

U.S. PATENT DOCUMENTS

| | | | |
|---|---|---|---|
| 2003/0225992 A1* | 12/2003 | Venkatrao | G06F 12/0802 |
| | | | 711/202 |
| 2005/0144388 A1* | 6/2005 | Newburn | G06F 12/0802 |
| | | | 711/118 |
| 2006/0047916 A1 | 3/2006 | Ying et al. | |
| 2016/0342530 A1 | 11/2016 | Pellerin, III et al. | |
| 2017/0255561 A1* | 9/2017 | Alameldeen | G06F 12/0868 |
| 2017/0371793 A1* | 12/2017 | Saidi | G06F 12/0868 |
| 2018/0004669 A1* | 1/2018 | Usui | G06F 12/0853 |
| 2019/0155731 A1* | 5/2019 | Hagersten | G06F 12/0864 |

OTHER PUBLICATIONS

Sardashti, et al., "Decoupled Compressed Cache: Exploiting Spatial Locality for Energy Optimization," (c) 2014 IEEE, pp. 91-99, IEEE Micro, May/Jun. 2014.

Sardashti, et al., "Yet Another Compressed Cache: a Low Cost Yet Effective Compressed Cache," Submitted on Feb. 19, 2016, https://hal.inria.fr/hal-01270792, 24 pages, Research Report RR-8853, Inria, Feb. 2016.

Sardashti, et al., "Decoupled Compressed Cache: Exploiting Spatial Locality for Energy Optimization," Micro-46, Dec. 7-11, 2013, Davis, CA, USA Copyright 2013 ACM 978-1-4503-2638—Apr. 13, 2012, 12 pages.

* cited by examiner

SYSTEMS, METHODS AND COMPUTER PROGRAM PRODUCTS USING MULTI-TAG STORAGE FOR EFFICIENT DATA COMPRESSION IN CACHES

TECHNICAL FIELD

This application relates to techniques for efficient data compression in caches using multi-tag storage techniques.

SUMMARY

The following presents a summary to provide a basic understanding of one or more embodiments of the invention. This summary is not intended to identify key or critical elements or delineate any scope of the different embodiments or any scope of the claims. Its sole purpose is to present concepts in a simplified form as a prelude to the more detailed description that is presented later. In one or more embodiments described herein, systems, computer-implemented methods, apparatus and/or computer program products are presented that provide techniques for increasing cache capacity with data compression without increasing the tag/data area overhead through multi-tag storage.

According to one or more embodiments, a device is described that comprises a memory that stores computer executable components and a processor that executes the computer executable components stored in the memory. The computer executable components comprise a tag hashing component that generates a hashed version of a tag for a data element, wherein the hashed version of the tag is smaller than the tag. The computer executable components further comprise a cache-write component that stores a compressed version of the data element in a data array of a cache, wherein the cache-write component further appends the tag to the compressed version of the data element as stored in the data array of the cache and stores the hashed version of the tag in a tag array of the cache.

In various implementations, the cache-write component stores the compressed version of the data element in a cacheline of the data array and wherein the cacheline further comprises a second compressed version of a second data element. With these implementations, the cache-write component stores the hashed version of the tag in a tag block of the tag array, wherein the tag block further comprises a second hashed version of a second tag for the second data element, and wherein the second hashed version of the second tag is smaller than the second tag. In this regard, a single tag block can store two or more hashes of tags and a single, corresponding cacheline can store two or more compressed data elements with the full tags appended thereto.

The computer executable components can further comprise a cache-read component that, in association with reading compressed data from the cache, determines hashed versions of tags and compares the hashed versions of the tags with hashed tag entries in the tag array. With these implementations, in association with reading the compressed data from the cache, the cache-read component determines a cache-hit or cache-miss by comparing the hashed tag entries with corresponding full versions of the tags respectively appended to compressed versions of data elements as stored in the data array, thereby preventing false positive cache reads based on the hashed versions of the tags.

In addition, the cache-write component can insert a compressed identifier into the tag and store the compressed identifier with the hashed version of the tag in the tag array. For example, in some implementations, the compressed identifier comprises a defined number of first bits and defined values for the bits of the tag. The cache-write component can further store full versions of tags in the tag array for decompressed data stored in the data array of the cache. With these implementations, in association with reading compressed data from the cache, the cache-read component determines whether a cacheline of the cache comprises compressed data or decompressed data based on whether a corresponding tag block of the tag array comprises a compressed line identifier.

In some embodiments, elements described in connection with the disclosed systems can be embodied in different forms such as a computer-implemented method, a computer program product, or another form.

DETAILED DESCRIPTION

Figure 1A:
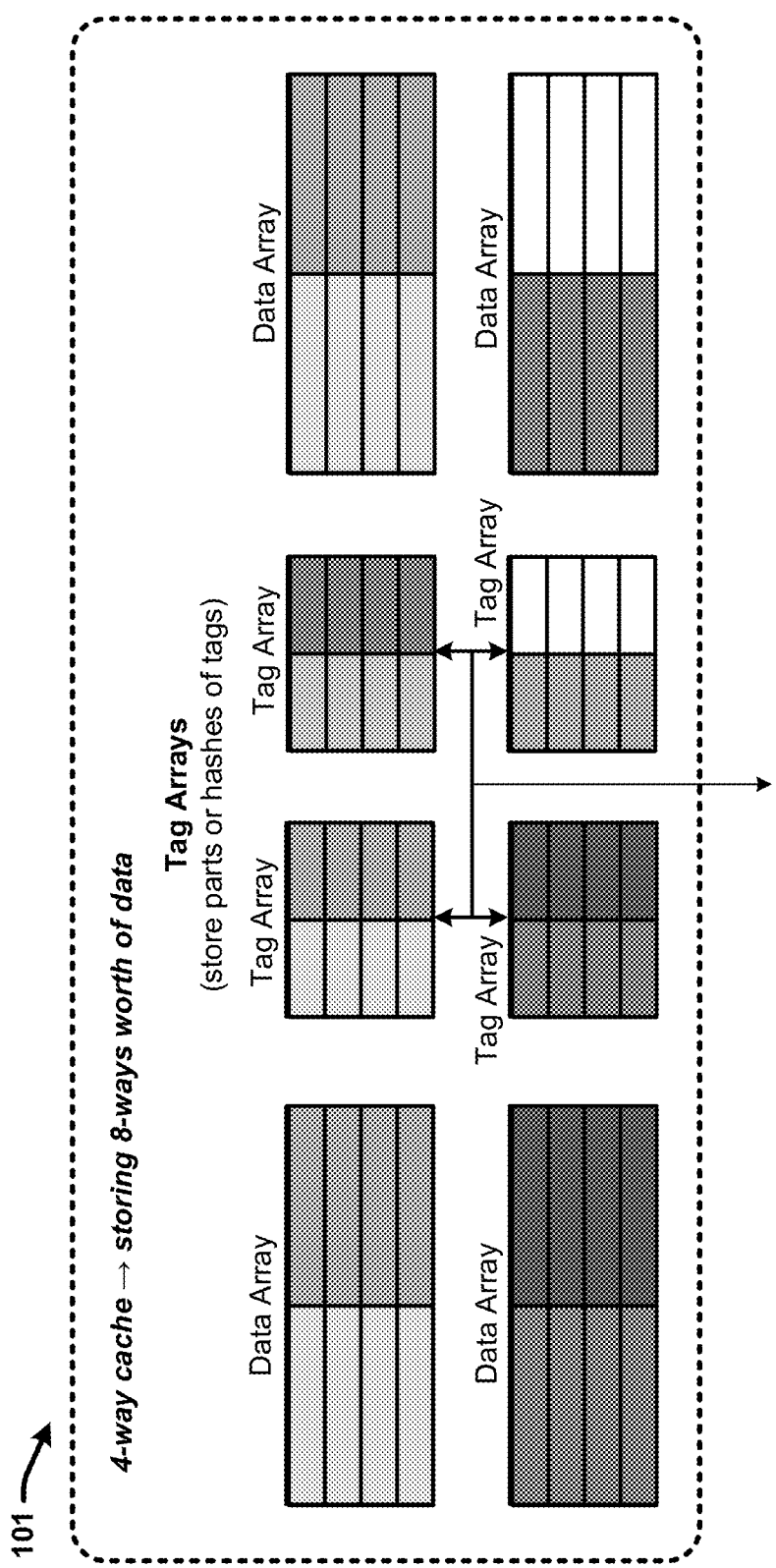
FIGS. 1A and 1B present illustrations of example caches with data compression that employ multi-tag storage in accordance with one or more embodiments of the disclosed subject matter.

The following detailed description is merely illustrative and is not intended to limit embodiments and/or application or uses of embodiments. Furthermore, there is no intention to be bound by any expressed or implied information presented in the preceding Summary section or in the Detailed Description section.

Caches, especially last-level caches (LLCs), have long been used to reduce effective memory latency and increase effective bandwidth. Caches also serve an increasingly important role in reducing memory system energy. Cache compression can increase the effective cache size by enabling storage of more amounts of data within a fixed cache structure. However, the tag structure of existing cache designs limits compression benefits. For example, in accordance with traditional cache structure and protocol, if the amount of data is compressed by 2 times (2×) the original amount, the number of tag entries must increase by 2×, resulting in increased overhead and complexity.

The subject disclosure provides systems, computer-implemented methods, apparatus and/or computer program products for enabling efficient data compression in caches without increasing the tag/data overhead. In accordance with the disclosed techniques, rather than storing a full tag for a compressed data element in the corresponding tag array, a hashed version of the tag can be stored in the tag array. The hashed version of the tag can correspond to a shortened or partial version of the tag and comprise fewer bits than the full tag. As a result, a plurality of hashed versions of tags for compressed data elements can be stored in a single tag block of the tag array without modifying the tag array. In this regard, the size, layout/design and associated overhead of the tag array can remain the same as the amount of compressed data stored in the data array of the cache increases. Accordingly, by storing compressed data using multiple hashed tags in the tag array, the disclosed techniques enable the effective increase in cache capacity afforded by data compression without increasing the overhead associated with tags for the compressed data.

The full or true tag for a compressed data element can further be appended to the compressed data element as stored in the data array to facilitate preventing false positive cache hits. In this regard, when the compressed data is read from the cache, the cache controller can compare a hashed version of a current tag for a requested data element with the hashed tag entries included in the tag array. To circumvent potential false positive cache hits based on matches between hashed versions of tags and hashed tag entries, based on detection of a match between a hashed version of a tag and a hashed tag entry, the cache controller can read the stored compressed data element and extract the full tag appended thereto. The cache controller can further confirm a cache-hit or a cache-miss based on whether the current tag matches the extracted full tag.

The disclosed techniques further provide a mechanism to bypass collisions of decompressed data with hashes of tags. In this regard, the subject caches can be configured to store both compressed and decompressed data and employ a unique mechanism for distinguishing between compressed lines and decompressed lines. In one or more embodiments, a compressed identifier (CID) can be used to identify tag blocks that comprise two or more hashes of tags as opposed to a single full tag, and to identify corresponding cachelines that comprise two or more compressed lines or compressed data elements. For example, the CID can comprise a predefined number of bits with predefined bit values that can be added to the first "m" bits of the tag block, wherein "m" can comprise an integer (e.g., 5, 8, 10, 12, etc.). In this regard, the controller can identify a tag block having the first m bits as the CID as having two or more "n" bit hashes of tags, wherein "n" can comprise a defined integer (e.g., 22 bits or less for a 44 bit true/full tag). In some embodiments, the controller can further insert the CID into the tag (e.g., the true/full tag) for the compressed data element to indicate the data element is compressed.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Figure 1B:
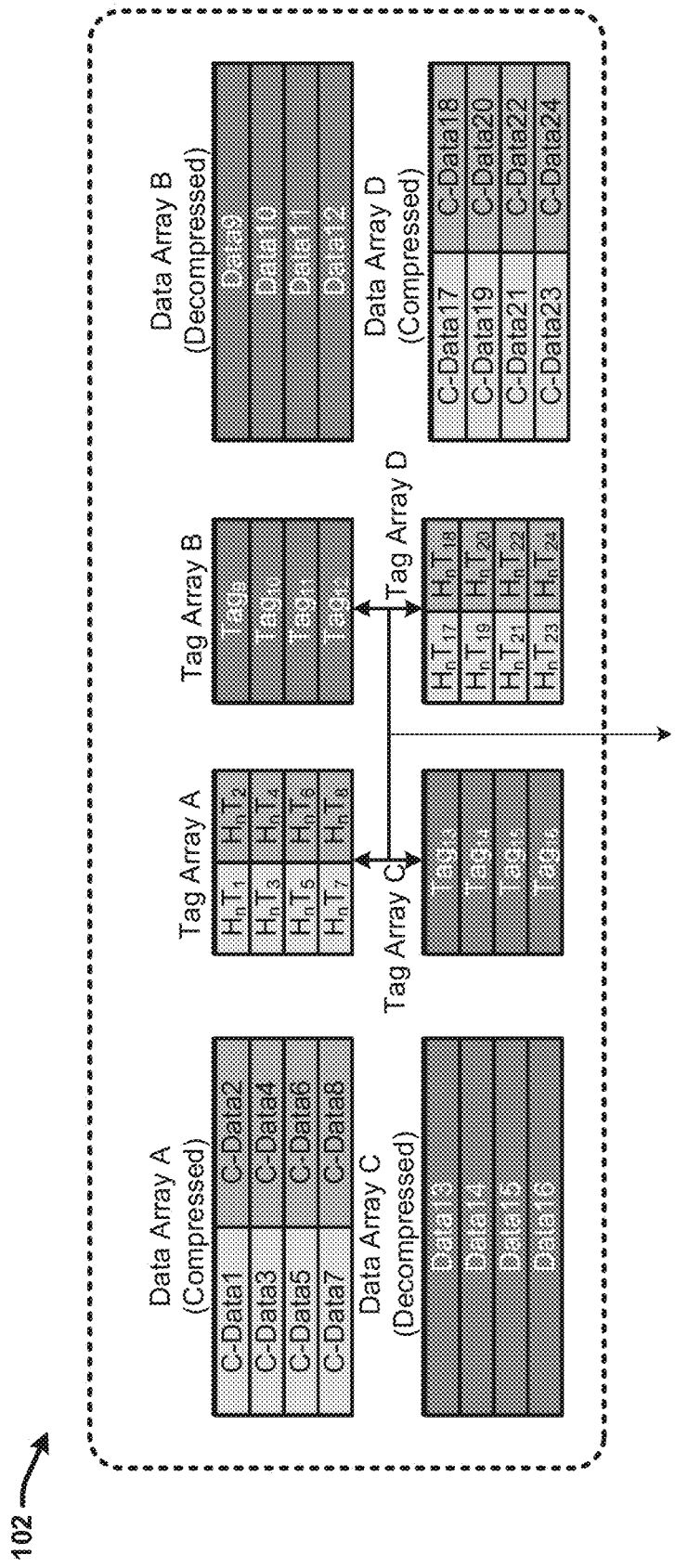

Turning now to the drawings, FIGS. 1A and 1B present illustrations of example caches in accordance with one or more embodiments of the disclosed subject matter. In accordance with the disclosed techniques for increasing the effective capacity of caches with data compression using multiple tags, the structure or layout of the cache can resemble that of a standard cache that stores only decompressed data. Such caches employ the same number of data arrays as tag arrays (e.g., the number of data arrays=the number of tag arrays).

For example, FIG. 1A presents an example 4-way cache with data compression that employs multi-tag storage techniques in accordance with one or more embodiments of the disclosed subject matter. The 4-way cache shown in FIG. 1A is referred to herein as cache 101. In the embodiment shown, cache 101 comprises 4 data arrays and 4 tag arrays. Each of the data arrays has 4 lines or cachelines (also referred to as sets). Each of the tag arrays also has 4 lines (also referred to as tag blocks). Unlike caches without data compression which only store a single data element per line/cacheline, each (or in some implementations one or more) data array of cache 101 can store two or more compressed data elements in the same line/cacheline. For example, in the embodiment shown in FIG. 1A, each data array is divided into two sections that are respectively identified with different grayscale shades to indicate that two compressed data elements are stored in each line/cacheline. In this regard, although cache 101 is technically a 4-way cache, cache 101 is capable of storing 8-ways worth of data, or 2X the amount of data relative to a cache that does not store compressed data. Thus, if the compression ratio is 2×, the effective cache capacity can be increased by 2×, if the compression ratio is 3×, the effective cache capacity can be increased by 3×, and so on.

Like uncompressed data elements stored in data arrays of a cache, each compressed data element requires a tag entry stored in the corresponding tag array. In this regard, when a particular compressed or decompressed line is looked up in a cache, that line is looked up in all 4 ways such that each of the 4 data arrays is checked and the tag entries in the corresponding tag blocks in each tag array are checked in parallel. In accordance with traditional cache structure and protocol, when the data in the data array is compressed by 2×, the number off tag entries must also increase by 2× (e.g., if you compress by 2×, you need 2× the number of tag entries). This creates additional overhead and complexity.

In one or more embodiments disclosed herein additional tags are stored for compressed data elements without modifying the structure of the tag area of the decompressed cache. In particular, rather than a full/true tag being stored in a corresponding tag array for each compressed line of a data array, in one or more disclosed embodiments only a part of the full/true tag is stored in the tag array. For example, if only X % (e.g., 30%, 50%, etc.) of the tag for a compressed data element is stored in the tag area, then only X % of the tag area is needed. In this regard, to provide tag bits for each compressed line (e.g., each of the 8-ways), the respective tag arrays can store a plurality (e.g., two in this example) of "partial" tags. In particular, rather than increasing the number of tag arrays to provide room for additional tag bits for the increased number of stored compressed data elements, the number of tag arrays can be kept the same as the number of data arrays. However, rather than storing full tags for each compressed data element in the data arrays, parts of the tags (e.g., hashes of the tags) can be stored in the tag arrays. For example, in the embodiment shown in FIG. 1A, each tag array is divided into two sections respectively shown in different grayscale shades. Each section can be used to store only a part of a full/true tag (e.g., a hash of the full/true tag). In this regard, with the example implementation demonstrated by cache 101, each tag block of each tag array can store 2 reduced versions of 2 full tags, one for each compressed line.

In various embodiments, the part of the tag or the reduced version of the tag can be a hash or hashed version of the tag and comprise fewer bits than the full tag. A hash value (or simply a hash), also called a message digest, is a number generated from a string of text (including numbers and/or letters). In various implementations, the hash for a string of text, such as a tag, can be generated by a formula in such a way that it is extremely unlikely (e.g., a 0.1%) that some other text string (e.g., tag) will produce the same hash value. The hash of a text string can be substantially smaller than the string itself. Thus, the hashed version of a tag can be smaller than the full tag. As a result, multiple hashes of tags can be stored in the same tag area conventionally used to store a single full/true tag. For example, by storing hashes of tags as opposed to full tags in the tag area of a cache, each data array of the cache can comprise a single corresponding tag array, and each tag block of the tag array can comprise two or more hashed versions of tags. In addition, each cacheline of the data array for the corresponding tag block can comprise two or more compressed data lines or data elements. In one or more embodiments, [[T]] the number of hashed tags included in a single tag block [[can]] corresponds to the number of compressed lines in the corresponding cacheline. In one or more embodiments, [[W]] when the compressed data is read from the cache, the cache controller [[can]] compares a hashed version of a current tag for a requested data element with the hashed tag entries included in the tag array. In this regard, during a read operation, rather than comparing full tags to full tag entries included in the tag array to identify a data element stored in the cache, the controller can compare hashes of tags to hashed tag entries included in the tag array (e.g., compare hashes to hashes).

For example, assume a system comprises a 10 megabyte (MB), 20-way cache (e.g., a level 3 (L3) cache)), wherein each cacheline is 128 bytes. The physical addresses (Addr) into the cache respectively comprise 56 bits (e.g., Addr=56 bits). Therefore, the number of sets (Num. of Sets)=(10× 1024×1024)/(20×128)=4096=$2^{12}$. Thus, the number of tag bits=Addr−$\log_2$(Num. of Sets)=44. In accordance with this example, the number of bits for each full/true tag for each physical address into the cache is 44. Rather than storing the full 44 bit tag for a compressed version of the data element stored in the corresponding cacheline, the tag can be hashed using an n-bit hash, and two hashes can be stored in the tag array by making n<(44/2 or 22). In accordance with this example, the respective hashes of tags can be identified as $Hash_n(tag1)$ or $H_nT_1$, and $Hash_n(tag2)$ or $H_nT_2$. In this regard, two n-bit tag hashes, wherein n<22, can be appended to one another in a same tag block or tag area to make a number up to 44 bits. The data area of the cache can likewise store two compressed data elements, one represented by each of the 2 n-bit tag hashes.

FIG. 1B presents an example cache 102 in accordance with this example implementation. As shown in FIG. 1B, cache 102 comprises 4 data arrays, respectively identified as Data Array A, Data Array B, Data Array C and Data Array D. Each of the 4 data arrays respectively has a corresponding tag array, respectively identified as Tag Array A, Tag Array B, Tag Array C and Tag Array D. In the embodiment shown, Data Array A and Data Array D comprise compressed data (C-Data), and Data Array B and Data Array C comprise decompressed (e.g., normal/uncompressed data). For the compressed data arrays (e.g., Data Array A and Data Array C), each cacheline or set (wherein each of the 4 data arrays respectively comprise 4 cachelines or sets) can comprise two compressed data elements. For example, with reference to Data Array A, the first line comprises C-Data1 (compressed data 1) and C-Data 2, the second line comprises C-Data 3 and C-Data4, and so on. Likewise, the corresponding tag array for the compressed data arrays respectively comprise two hashed versions of tags in each line. For example, the first line of Tag Array A comprises hashed tag $H_nT_1$ for C-Data1 and hashed tag $H_nT_2$ for C-Data2, the second line of Tag Array A comprises hashed tag $H_nT_3$ for C-Data3 and hashed tag $H_nT_4$ for C-Data4, and so on. In this regard, rather than storing a full tag, $Tag_1$, for C-Data1 in the tag array, the hash of Tag1 ($H_nT_1$) can be stored in the tag array. Likewise, rather than storing the full tag, $Tag_2$ for C-Data 2 in the tag array, the hash of Tag2 ($H_nT_2$) can be stored in the tag array. In this regard, a portion of the tag for a compressed data element can be stored in the tag area without changing the tag array structure.

Example cache 102 also includes uncompressed (or decompressed) data shown in two of the data arrays. In particular, with the disclosed techniques, a cache can simultaneously store compressed and decompressed data elements/lines. For decompressed lines however, the full/true tag can be stored in the tag area in accordance with conventional cache storage techniques. As discussed infra, in one or more embodiments, a unique identifier referred to herein as a CID can further be used to distinguish between compressed and decompressed lines.

In one or more embodiments, the number of bits "n" used for the portion or hash of the tag that is stored in the data area can vary so long as the number of bits "n" is less than the total number of bits "b" of the tag. For example, in various embodiments, the number of bits "n" used for the portion or the hash of the tag can be less than or equal to 50% of the number of bits "b" of the tag (e.g., n<b/2). In other embodiments, the number of bits "n" used for the portion or hash of the tag can be less than or equal to X % of the number of bits "b" of the tag, wherein X=is between 5 and 50.

In particular, hashing tags for compressed data elements works because false positive cache-hits based on comparison of hashes to hashes are rare. In accordance with the disclosed techniques, a false positive attributed to hashes refers to detection of a match between a hash determined for a current tag of a requested data element and a hash tag entry included in the tag array, where the full tag for the requested data element would not match the full tag from which the hashed tag entry was generated. For example, by hashing a tag comprising "b" bits into an "n" bit hash, if n=10 for a 44-bit tag, the number of false positives (e.g., false positive cache hits) expected will only occur every 1024 accesses. In this regard, 99.9% of the time, the 10-bit hash would match the true tag and be a true positive. Accordingly, even by setting "n" to even less than 25% of "b", false positives would occur only 0.1% of the time, rendering the performance overhead less than 0.1%.

Figure 2:
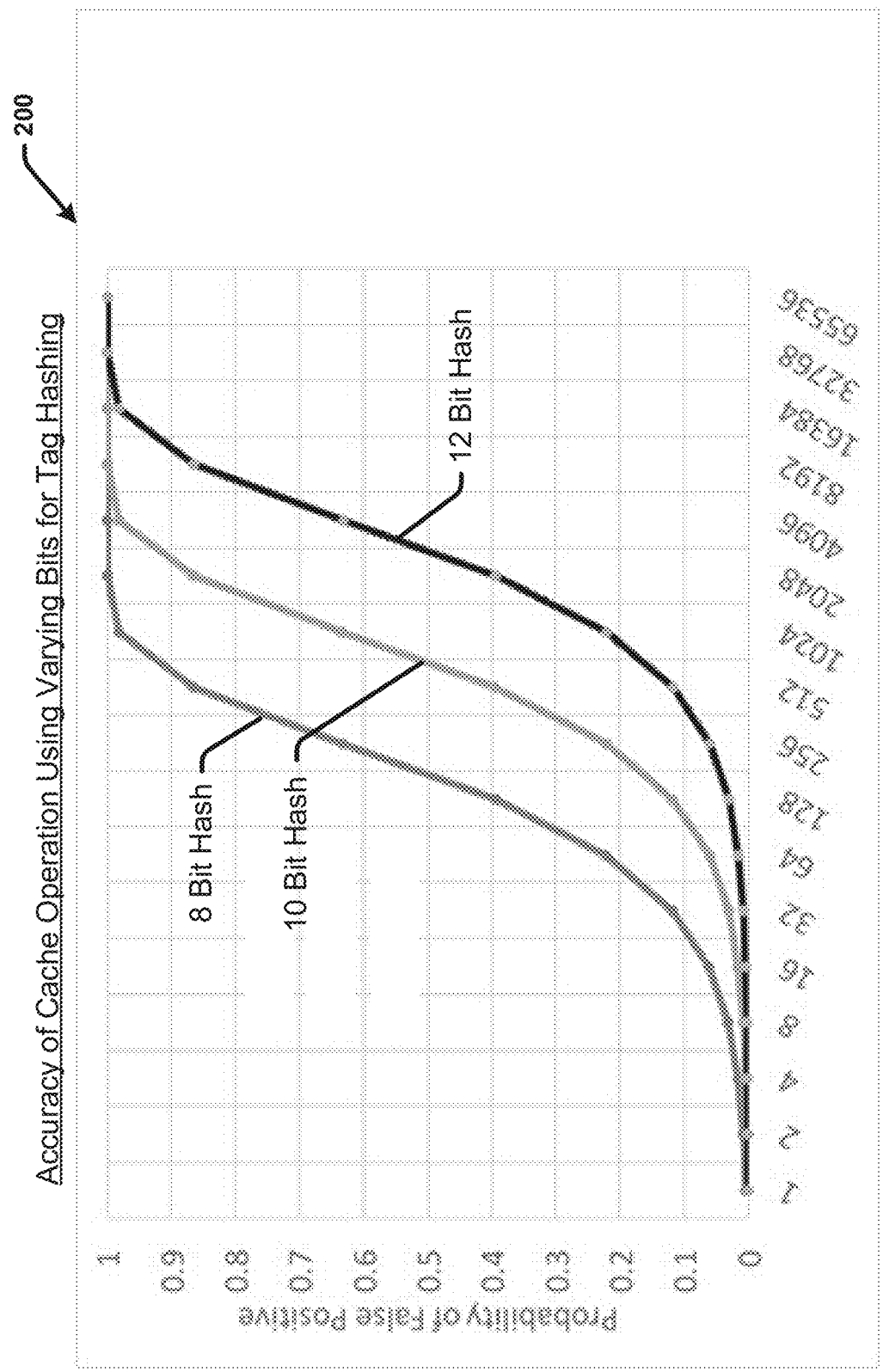
FIG. 2 presents a graph demonstrating the accuracy of cache operation using tag hashing to enable multi-tag storage for efficient data compression in caches in accordance with one or more embodiments of the disclosed subject matter.

For example, FIG. 2 presents a graph 200 demonstrating the accuracy of cache operation using tag hashing to enable multi-tag storage for efficient data compression in caches in accordance with one or more embodiments of the disclosed subject matter. As shown in graph 200, the probability of false positives is less than 1.0% for an 8-bit hash, a 10-bit hash and a 12-bit hash, even up to 32,768 accesses.

However, various embodiments of the disclosed subject matter further provide a mechanism to detect even these rare occurrences of false positives when storing multiple hashes of tags for compressed data, thereby enabling effective and efficient data compression in caches. In accordance with these embodiments, in addition to storing a hash of a tag for a compressed data element in the tag array of the cache, the tag (e.g., the full/true tag) can be appended to and stored with the compressed data element in the data array. In particular, for each (or in some implementations one or more) compressed data element stored in the data array of the cache, the full tag (e.g., all 44 bits) can be stored with the compressed data element in the data array and a hash of the tag can be stored in the tag array. In this regard, in association with reading compressed data from the cache, the cache controller can compare a hashed version of a known tag for a requested data element with respective hash tag entries included in the tag array. Based on detection of a match between the hashed version and a hashed tag entry, prior to declaring a cache-hit, the cache controller can read the compressed data element corresponding to the hash tag entry, extract the full tag appended to the compressed data element, and compare the full known tag with the extracted full tag. If the full known tag matches the extracted full tag, the controller can declare a cache hit and read/retrieve the compressed data element from the cache.

Figure 3:
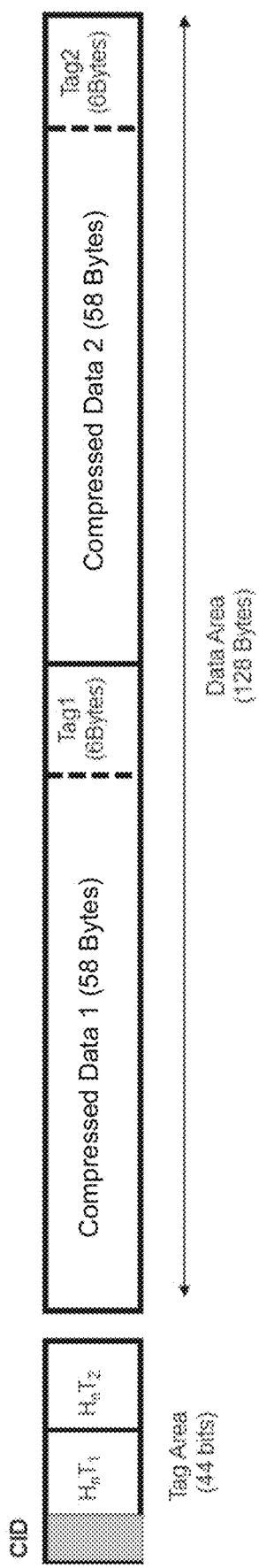
FIG. 3 presents an example configuration of a cacheline for storing compressed data in caches with hashes of tags stored in the tag area, and full versions of the tags stored in the data area, respectively appended to the compressed data line, in accordance with one or more embodiments of the disclosed subject matter.

For example, FIG. 3 presents an example configuration of a cacheline for storing compressed data in caches with hashes of tags stored in the tag area and full versions of the tags stored in the data area, respectively appended to the compressed data line, in accordance with one or more embodiments of the disclosed subject matter. A single line cache is depicted that includes a tag area (e.g., a tag block) and a data area (e.g., a cacheline corresponding to the tag block). In the embodiment shown, the tag area is 44 bits and the data area is 128 bytes. By compressing the data, two compressed data elements can be stored in a single cacheline. For example, in the embodiment shown, the data elements are identified as compressed data 1 and compressed data 2. The tag area further comprises two hashes of tags, one for compressed data 1 ($H_nT_1$) and another for compressed data 2 ($H_nT_2$). Each of the compressed data elements included in the data area further includes the full tag (from which the hashed tag entry was generated) appended thereto. For example, tag1 is appended to compressed data 1 in the data area and the hash of tag1, ($H_nT_1$), is included in the tag area. Likewise, tag2 is appended to compressed data 2 in the data area and the hash of tag2, ($H_nT_2$), is included in the tag area.

In one or more embodiments, in order to make room for appending the full tag for a compressed data element to the compressed data element as stored in the data area, the respective data elements stored in the same cacheline can respectively be compressed to size such that their cumulative number of bytes is less than the size of the data area. For example, in the embodiment shown, each compressed data element is 58 bytes and the data area is 128 bytes. Thus, the total size of both compressed data elements is 116 bytes, leaving 12 bytes (128-116) open for the full tags (e.g., 6 bytes for tag1 and 6 bytes for tag2). In accordance with this example, the uncompressed or decompressed size of each data element is 124 bytes. Thus, by compressing each data element by slightly more than 50% (e.g., 124 bytes to 58 bytes as opposed to 62 by bytes), enough space can be made available in the data area for appending the full tag to the compressed data element. The degree of compression for each data element to be stored in the cache in a compressed state can thus be based on the total number of bytes of the data area of the cacheline, the number of bytes of each decompressed data element, and the sizes of the full tags for each compressed data element. By including the full tag for a compressed data element in the data area, during a read operation, the controller initially accesses the tag area to see if the hash of a known tag for a requested data element matches a hashed tag entry. If a match is found, the controller then reads the corresponding data and also checks to see whether the known tag matches the full tag appended to the compressed data before declaring a cache-hit. Most of the time (e.g., 99.9% of the time), the tag will match and this read from the data area is not wasteful. In other words, the data array will need to be read for all true matches or cache-hits. Because 99.9% of the time a false positive will not be detected, the overhead spent on checking both hashes of tags in the tag array and full tags extracted from the data array is minuscule and not wasteful.

In some embodiments, the degree of compression for each data element to be stored in the cache in a compressed state can also be based the number of compressed data elements to be included in the same cacheline, In this regard, in some implementations, the number of compressed data elements can be two or greater (e.g., 2, 3, 4, 5, etc.). Likewise, the number of hashed tags that can be stored in the same tag block can also vary and depend on the number of compressed lines or data entries stored in the corresponding cacheline of the corresponding data array. For instance, in the examples demonstrated with reference to cache 101 and cache 102, the tag array can store 2 hashed tags, one for each of two compressed lines in the corresponding data array. However, the number of compressed lines/data elements that can be stored in the same cacheline of a data array and the number of corresponding hashes of tags for the compressed lines/data elements that can be stored in the corresponding tag area can be greater than 2 (e.g., 2 compressed lines=2 hashes of tags, 3 compressed lines=3 hashes of tags, 4 compressed lines=4 hashes of tags, etc.). Further, in some implementations, the number of tag bits "n" used for a hashed version of a tag can vary depending on the number of hashed versions of tags stored in the same data block. For example, if the tag area is shared between two hashed tags, then each of the tags can comprise 50% of the total number of bits "b" of their corresponding tags. Likewise, if the tag area is shared between three hashed tags, then each of the tags can comprise 33% of the total number of bits "b" of their corresponding tags, and so on.

FIG. 3 also demonstrates the inclusion of a compressed identifier CID in the tag area. In various embodiments, a unique header, referred to herein as a compressed identifier (CID) can further be stored in the tag block to indicate that the tag block comprises two or more hashes of tags as opposed to a single full tag, and to indicate that the corresponding cacheline comprises two or more compressed data elements. For example, cache 102 includes a CID (shown as a grey block) in the tag area that precedes both tag hashes. In some embodiments, the CID can also be inserted into a full tag for a compressed data element to indicate that the data element is compressed. In particular, with the disclosed techniques, a cache can store both compressed and decompressed data. Decompressed lines can be stored in the cache in a regular fashion (e.g., using full/true tags in the tag array for decompressed data elements), while compressed lines can be stored in the cache with multiple tags, including a hashed version of the tag in the tag area and the full tag appended to the compressed line in the data area. Thus, the CID can facilitate distinguishing between compressed lines and decompressed lines in the cache.

In one or more embodiments, the CID can comprise a predefined number of bits with predefined bit values that can be added to the first "m" bits of the tag block, wherein "m" can comprise an integer (e.g., 5, 8, 10, 12, etc.). For example, in some implementations, the CID can comprise "m" bits of all zeros (e.g., 10 zeros). According to this example, if the controller sees that a tag line has a tag identifier (e.g., first 10 bits are zeros), the controller can assume the next x bits include two tag hashes, each being n-bits long. If the controller does not see the CID, the controller can assume the line is not compressed and the tag in the tag area is a single full tag. In this regard, the controller can identify a tag block having the first m bits as the CID as having two or more "n" bit hashes of tags, wherein "n" can comprise a defined integer (e.g., 22 bits or less for a 44-bit true/full tag).

In addition, uncompressed or decompressed lines that have tags with the first m-bits as the CID can be bypassed in the cache. For example, for a 10-bit CID, the probability of bypass is 0.1%. Thus, the performance overhead associated with this bypass protocol is low (e.g., less than 0.2%). In this regard, the m-bit CID (e.g., 10 bits) is an indicator that can be combined with a tag to indicate if the tag is hashed or not, i.e., if the tags are hashes (compressed lines) or not. In some implementations, there can be a small chance that the top m-bits of a full/true tag can exactly match the top-m bits of CID. If these tags were to be stored in the tag array of the cache, the controller would incorrectly assume that the tag is a hash and that the corresponding line comprises two compressed data elements. To circumvent this scenario, any full/true tag for a data element that happens to have the first m-bits as the CID can be skipped and the tag and the corresponding data element can be prevented from being stored in the cache. In other words, by bypassing uncompressed tags when their first m-bits match the CID, the controller can avoid any potential misinterpretations of compressed data.

In various embodiments, the CID can be the same number for all compressed data elements. In other embodiments, different CIDs can be used to indicate different characteristics of a compressed data element and/or a compressed cacheline. For example, in some implementations, different CIDs can be used to indicate different sizes of hashes of tags and/or different sizes of compressed data. In another implementation, different CIDs can be used to indicate the number of hashes of tags included in the same tag area and/or the corresponding number of compressed data elements included in the data area (e.g., CID1=2 compressed data elements, CID2=3 compressed data elements, CID3=4 compressed data elements, etc.).

Figure 4:
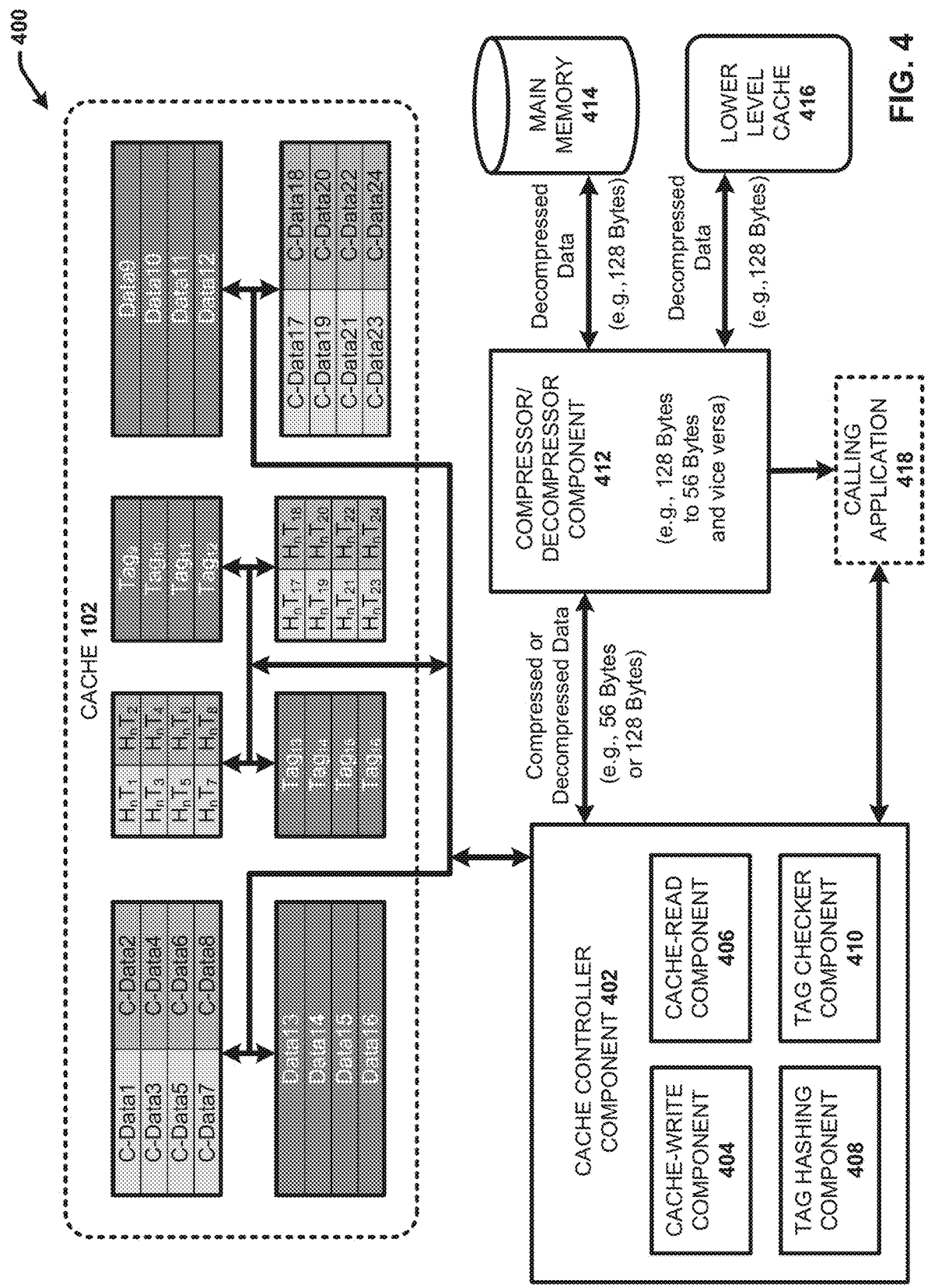
FIG. 4 illustrates an example non-limiting system that employs multi-tag storage techniques to enable efficient data compression in caches without increasing the tag/data overhead in accordance with one or more embodiments of the disclosed subject matter.

FIG. 4 illustrates an example non-limiting system 400 that employs multi-tag storage techniques to enable efficient data compression in caches without increasing the tag/data overhead in accordance with one or more embodiments of the disclosed subject matter. Repetitive description of like elements employed in respective embodiments is omitted for sake of brevity.

System 400 includes a cache (e.g., cache 102), a cache controller component 402 communicatively coupled to the cache 102, a compressor/decompressor component 412 communicatively coupled to the cache controller component 402, a main memory 414 communicatively coupled to the compressor/decompressor component 412, and a lower level cache 416 also communicatively coupled to the compressor/decompressor component 412. Although the cache shown in system 400 is cache 102, which is a 4-way cache, it should be appreciated that the size of the cache can vary. However, the general structure of the cache, including the same number of data arrays as tag arrays, can remain the same.

The cache controller component 402 can control the operations of the cache 102 in accordance with the disclosed techniques for employing multi-tag storage to enable efficient data compression in caches without increasing the tag/data overhead. In this regard, the cache controller component 402 can comprise cache-write component 404 to control writing data to the cache 102, and a cache-read component 406 to control reading data from the cache 102. For example, in association with a cache writing operation, the cache-write component 404 can receive compressed or decompressed data elements to be stored in the cache from the compressor/decompressor component 412. For example, the compressor/decompressor can retrieve decompressed data to be stored in the cache 102 from the main memory 414, a lower level cache 416 or another data source. In scenarios in which the cache 102 has enough room to store the data in an uncompressed state and/or the data cannot be compressed, the compressor/decompressor component 412 can provide the cache-write component 404 with the data in the decompressed state for storing in the cache in accordance with standard caching protocol (e.g., with the full tag in the corresponding tag array). However, in scenarios in which the cacheline for storing the data already has existing data and/or the data can be compressed, the cache-write component 404 can receive the data from the compressor/decompressor component 412 in a compressed state for storing in the cache 102 in accordance with the disclosed cache compression techniques. Likewise, in association with a cache-read procedure, the cache-read component 406 can send decompressed data elements read from the cache to the calling application 418. If the data read from the cache is compressed, in some implementations, the cache-read component 406 can send the compressed data to the compressor/decompressor component 412 for decompression prior to providing the data to the calling application 418. The functions of the cache-write component 404 and the cache-read component are described in greater detail infra with reference to FIGS. 6 and 7, respectively.

Figure 5:
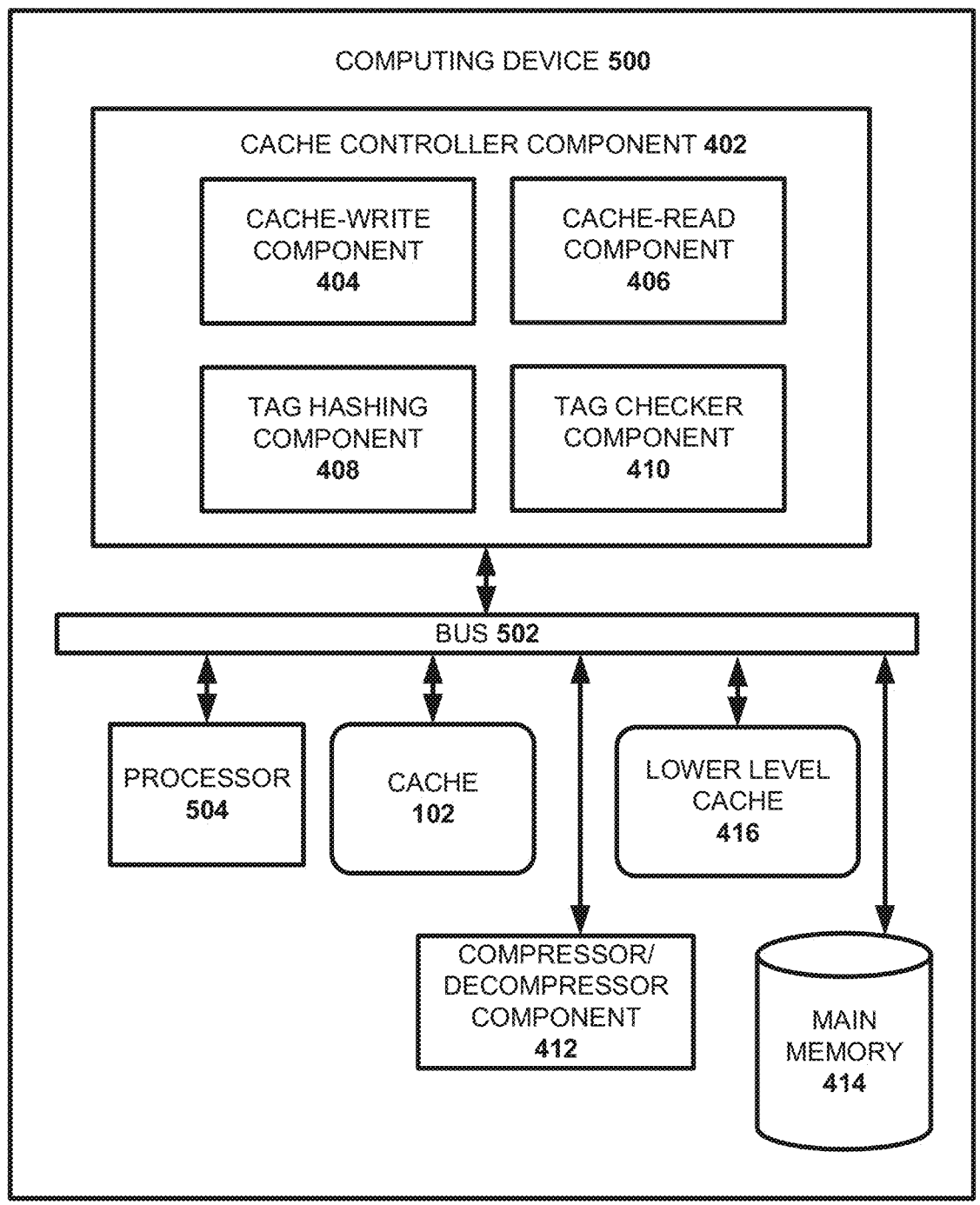
FIG. 5 illustrates a block diagram of an example, non-limiting device that employs multi-tag storage techniques to enable efficient data compression in caches without increasing the tag/data overhead in accordance with one or more embodiments of the disclosed subject matter.

As shown in FIG. 5, the cache controller component 402 further includes a tag hashing component 408 to facilitate generating hashes of tags in association with both write and read operations. For example, in association with storing compressed data elements to the cache 102, the tag hashing component 408 can generate hashed versions of the full/true tags for the data elements. The manner or algorithm applied by the tag hashing component 408 to generate the hashes of the full/true tags can vary. In association with reading compressed data elements from the cache 102, the tag hashing component 408 can also generate or determine the hash of the known full/true tag of the called data element which can be compared to the hashed tag entries included in the tag area of the cache. The cache controller component 402 can also include a tag checker to facilitate distinguishing between tags for decompressed and compressed data, (e.g., to facilitate distinguishing between full/true tags and hashes of tags), and to facilitate checking tags and hashes of tags in the tag area and/or the data area. For example, in association with reading data from the cache, the tag checker component 410 can determine whether a cacheline has compressed or decompressed data based on whether the corresponding tag block comprises the CID. The tag checker component 410 can also compare hashes of tags for called data elements with hash tag entries included in the tag area of the cache. The tag checker component 410 can also compare full tags for called data elements with the full tags appended to compressed data elements in the data array. Additional features and functionalities of the tag hashing component 408 and the tag checker component 410 are discussed in greater detail infra with reference to FIGS. 6 and 7.

Embodiments of system 400 and other systems and devices described herein can include one or more machine-executable components embodied within one or more machines (e.g., embodied in one or more computer readable storage media of the one or more machines). Such components, when executed by the one or more machines (e.g., processors, computers, computing devices, virtual machines, etc.) can cause the one or more machines to perform the operations described. For example, in various embodiments, the cache controller component 402 (and the components associated with the cache controller component 402) and the compressor/decompressor component 412 can respectively comprise computer executable components.

FIG. 5 illustrates a block diagram of an example, non-limiting device, computing device 500, that comprises and/or executes one or more components of system 400 in accordance with one or more embodiments of the disclosed subject matter. Repetitive description of like elements employed in respective embodiments is omitted for sake of brevity. In the embodiment shown, the computing device 500 includes the cache controller component 402, the cache 102, the compressor/decompressor component 412 and the lower level cache 416. The computing device 500 can further include or be operatively coupled to least one main memory 414 and at least one processor 504. In various embodiments, the at least one main memory 414 can store executable instructions (e.g., the cache controller component 402 and the associated components, and the compressor/decompressor component 412) that when executed by the at least one processor 504, facilitate performance of operations defined by the executable instruction. The computing device 500 can further include or be operatively coupled to at least one cache 102 to store frequently used data. The cache 102 can comprise hardware and/or software that stores data so that future requests for that data can be served faster. For example, the cache 102 can store copies of data stored in the main memory 118 and/or stored in another memory component (e.g., an external memory, a lower level cache, etc.). The computing device 500 further includes a device bus 502 that communicatively couples the various components of the computing device 500. Examples of processor 504 and main memory 414, as well as other suitable computer or computing-based elements, can be found with reference to FIG. 11, and can be used in connection with implementing one or more of the components shown and described in connection with FIG. 5 or other figures disclosed herein.

In some implementations, one or more components of the computing device 500, and/or the various external systems and data sources can be communicatively connected via one or more networks. For example, the cache controller component 402, the cache 102, the compressor/decompressor component 412, and/or the main memory 414 can be communicatively coupled either directly or via one or more networks. Such networks can include wired and wireless networks, including but not limited to, a cellular network, a wide area network (WAN, e.g., the Internet) or a local area network (LAN). These networks can use virtually any desired wired or wireless technology, including but not limited to: wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), ZIGBEE® and other 802.XX wireless technologies and/or legacy telecommunication technologies, BLUETOOTH®, Session Initiation Protocol (SIP), RF4CE protocol, WirelessHART protocol, 6LoWPAN (IPv6 over Low power Wireless Area Networks), Z-Wave, an ANT, an ultra-wideband (UWB) standard protocol, and/or other proprietary and non-proprietary communication protocols. The computing device 500 can thus include hardware (e.g., a central processing unit (CPU), a transceiver, a decoder), software (e.g., a set of threads, a set of processes, software in execution) or a combination of hardware and software that facilitates communicating information between the computing device 500 and externals systems, sources and devices. Repetitive description of like elements employed in respective embodiments is omitted for sake of brevity.

Figure 6:
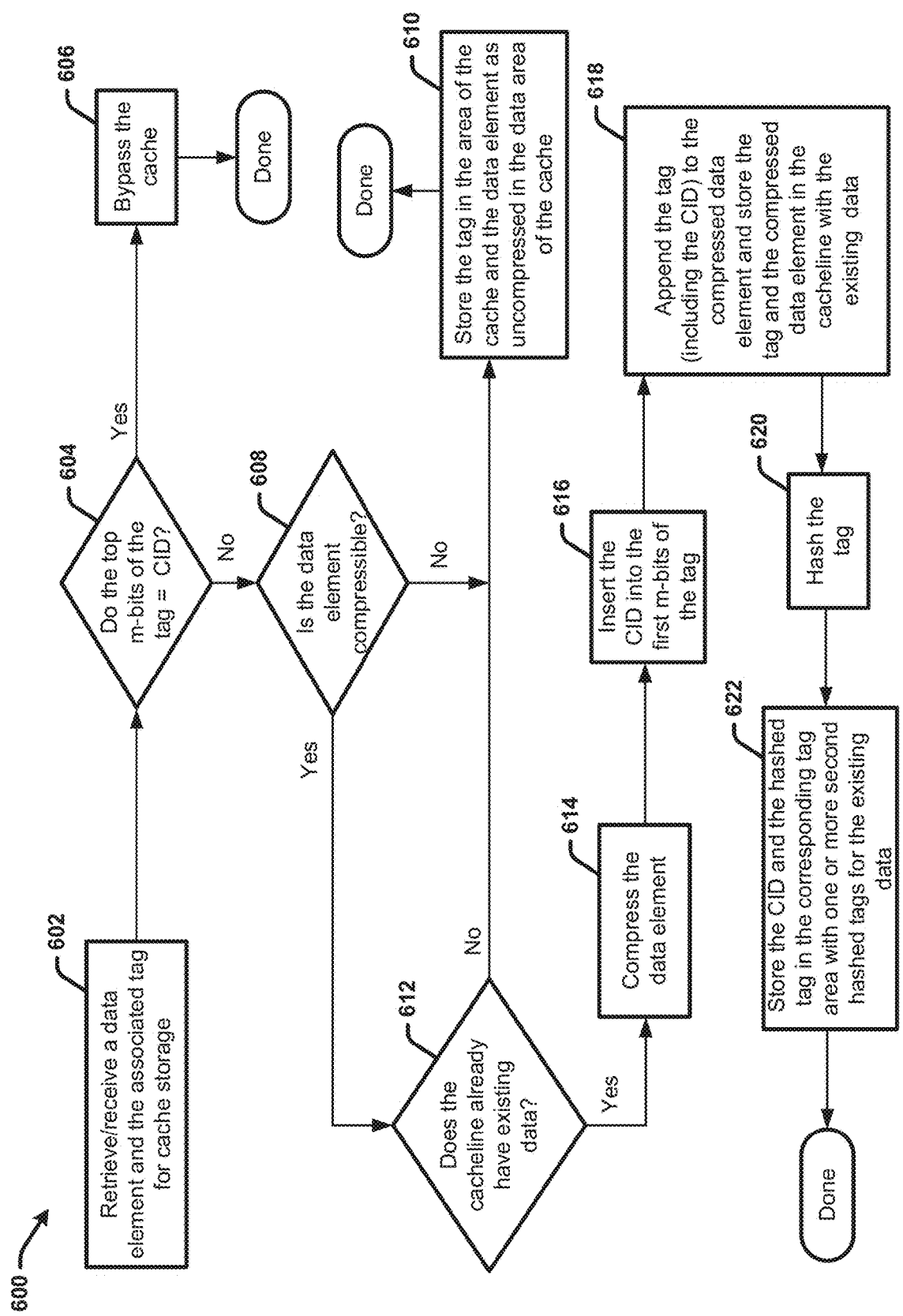
FIG. 6 provides a high-level flow diagram of an example computer-implemented process for writing data to a cache using multi-tag storage techniques to enable efficient data compression in accordance with one or more embodiments of the disclosed subject matter.

FIG. 6 provides a high-level flow diagram of an example computer-implemented process 600 for writing data to a cache (e.g., cache 102) using multi-tag storage techniques to enable efficient data compression in accordance with one or more embodiments of the disclosed subject matter. In one or more embodiments, process 600 can be facilitated by and/or performed by the cache controller component 402 (e.g., using the cache-write component 404, the tag hashing component 408 and/or the tag checker component 410). Repetitive description of like elements employed in respective embodiments is omitted for sake of brevity.

With reference to FIG. 6, and FIG. 4, at 602, the cache-write component 404 can retrieve/receive data element and the associated tag (e.g., the full/true tag) for cache storage (e.g., from the main memory 414 or the lower level cache 416). At 604, the tag checker component 410 can evaluate the tag to determine whether the top or first "m" bits of the tag correspond to the CID. If so, storage of the data element to the cache is bypassed at 606. If at 604 the tag checker determines that the top "m" bits of the tag do not correspond to the CID, then at 608, the cache-write component determines whether the data element is compressible. For example, in various embodiments, the cache-write component 404 can determine whether a data element is compressible based on the number of bytes of the data element, wherein the number of bytes that makes a data element compressible or not can be predefined. In other embodiments, the compressor/decompressor component 412 can determine whether the data element is compressible, and, at 608, the cache-write component 404 can receive an indication (e.g., from the compressor/decompressor component 412) whether the data element is compressible or not. If at 608 a determination is made that the data element is not compressible, then process 600 proceeds to 610, wherein the cache-write component 404 stores the tag (e.g., the full/true tag) in the tag area of the cache and the data element as uncompressed in the data area of the cache. If at 608 a determination is made that the data element is compressible, then process 600 proceeds to 612.

At 612, the cache-write component 404 determines whether the cacheline for storing the data element already has existing data. For example, the cache-write component 404 can determine the cacheline has existing data if the cacheline already has compressed or uncompressed data stored therein. In another example, the cache-write component 404 can determine that the cacheline has existing data if the cacheline comprises data classified as invalid. If at 612 the cache-write component determines that the cacheline does not already have existing data, then process 600 can proceed to 610 and the cache-write component 404 can store the tag (e.g., the full/true tag) in the tag area of the cache and the data element as uncompressed in the data area of the cache.

However, if at 612 the cache-write component 404 determines that the cacheline already has existing data then process 600 proceeds to 614. In this regard, at 614 the data element is compressed (e.g., by the compressor/decompressor component 412), the cache-write component 404 inserts the CID into the first m-bits of the tag at 616, and at 618, the cache-write component 404 appends the tag (including the CID) to the compressed data element and stores the tag and the compressed data element in the cacheline with the existing data, resulting in a plurality of (compressed) data elements stored in the same cacheline. Further, at 620, the tag hashing component 408 can hash the tag and at 622, the cache-write component 404 can store the CID and the hashed tag in the corresponding tag area with one or more second hashed tags for the existing data. In various embodiments, if the cacheline already has a first uncompressed data element therein, the cache controller can compress the first data element in accordance with the techniques discussed herein prior to compressing and placing a second data element in the same cacheline. In this regard, if at 612, the cache-write component 404 determines that a cacheline has a first uncompressed data element therein, then both the first and the second data elements can be compressed, at 614, and stored in the cacheline with the full tags for each of the first and second data elements appended thereto, at 618. In addition, the tag hashing component 408 can generate hashed tags for each of the first and second data elements and store both hashed tags in the corresponding tag array area (e.g., in single corresponding line of the tag array) with the CID inserted into the first m-bits of the tag area.

Figure 7:
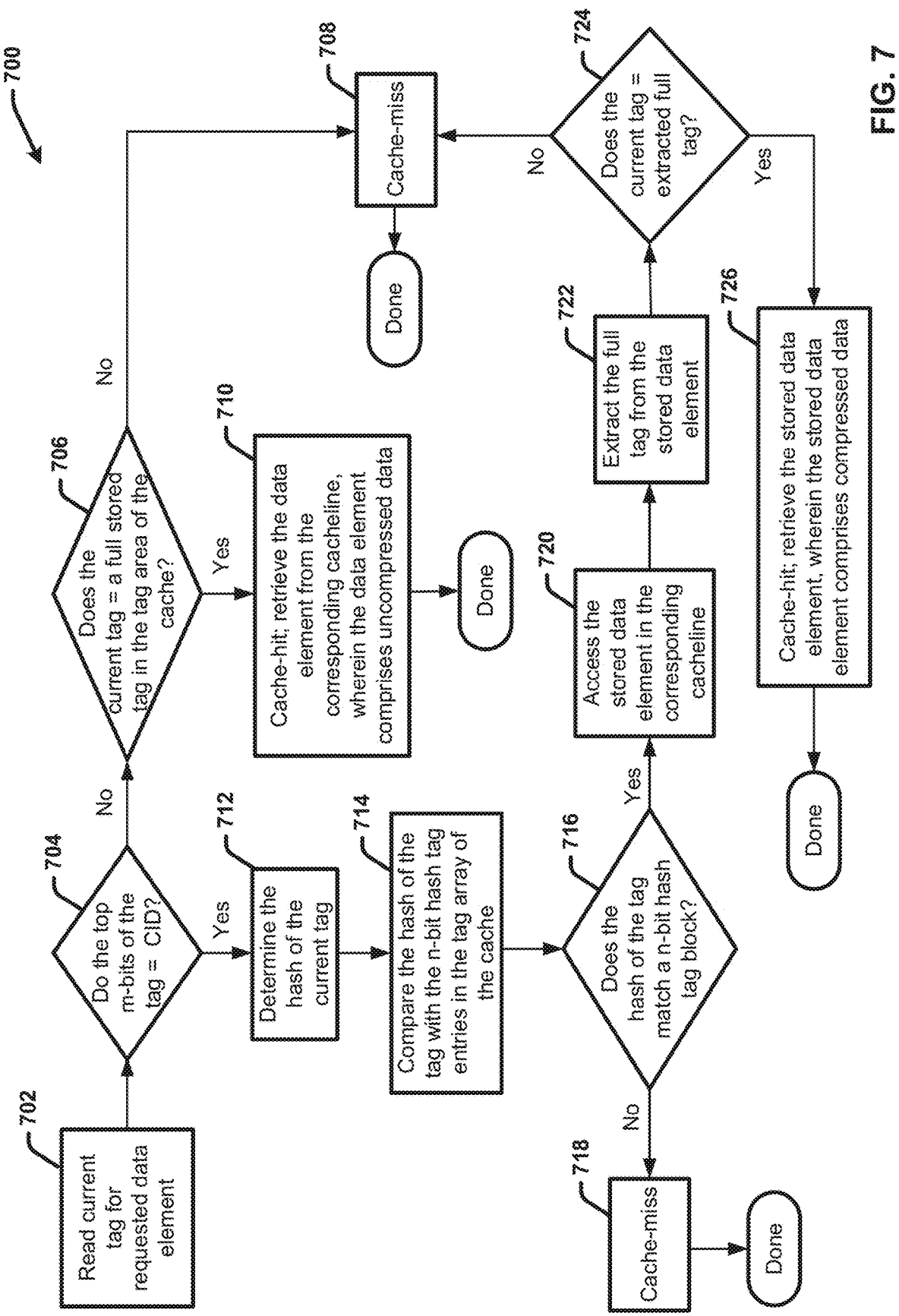
FIG. 7 provides a high-level flow diagram of an example computer-implemented process for reading data from a cache that employs multi-tag storage to enable efficient data compression in accordance with one or more embodiments of the disclosed subject matter.

FIG. 7 provides a high-level flow diagram of an example computer-implemented process 700 for reading data from a cache that employs multi-tag storage to enable efficient data compression in accordance with one or more embodiments of the disclosed subject matter. In one or more embodiments, process 700 can be facilitated by and/or performed by the cache controller component 402 (e.g., using the cache-read component 406, the tag hashing component 408 and/or the tag checker component 410). Repetitive description of like elements employed in respective embodiments is omitted for sake of brevity.

With reference to FIG. 7, and FIG. 4, at 702, the cache-read component 406 can read the current tag for the requested data element. At 704, the tag checker component 410 can determine whether the top or first "m" bits of the tag match the CID. If not, the cache-read component 406 can assume that the requested data element is stored in an uncompressed state and proceed with a normal cache read process. In this regard, at 706, the tag checker component 410 can determine whether the current tag matches a full stored tag in the tag area of the cache. If so, the cache-read component 406 can declare a cache-hit and read/retrieve the data element from the corresponding cacheline at 710, wherein the data element comprises uncompressed data. However, if at 706 the tag checker component 410 determines that the current tag does not match any of the full tag entries in the tag array of the cache, then at 708 the cache-read component 406 can declare a cache-miss.

Returning to 704, if the tag checker component 410 determines that the top "m" bits of the tag comprise the CID, the cache-read component 406 can assume the data element is compressed in the cache and proceed with comparing hashes to hashes in the tag array. In this regard, at 712, the tag hashing component 408 can determine or generate the hash of the current tag (e.g., using a predefined hashing algorithm, which will be the same algorithm that was used to generate and write the hash tag entry into the tag array of the cache). At 714, the tag checker component 410 can compare the hash of the tag with the n-bit tag entries in the hashed tag array of the cache to find a match. For example, the tag checker component 410 can identify tag blocks that comprise the CID (e.g., as the first "m" bits of the tag block) and know that these tag blocks comprise hashed tag entries and that their corresponding cachelines comprise two or more compressed data elements. The tag checker component 410 can further compare the hash of the tag with the hash tag entries included in these tag blocks (e.g., the tag blocks comprising the CID). If, at 716, the tag checker component 410 does not find a match between the hash of the tag and any of the hash tag entries, the cache-read component 406 can declare a cache miss, at 718.

However, if at 716 the tag checker component 410 finds a match, at 720 the cache-read component 406 can access the stored data element in the corresponding cacheline. At 722, the cache-read component can further extract the full tag from the stored data element and, at 724, compare the current tag to the extracted full tag (e.g., to ensure a false positive read has not occurred). If at 724 the tag checker component 410 determines that the current tag does not match the extracted full tag, then the cache-read component 406 can declare a cache-miss at 708. However, if at 724 the tag checker component 410 confirms that the current tag matches the extracted full tag, then the cache-read component 406 can consider it a cache-hit at 726 and retrieve the stored data element, wherein the stored data element comprises compressed data.

Figure 8:
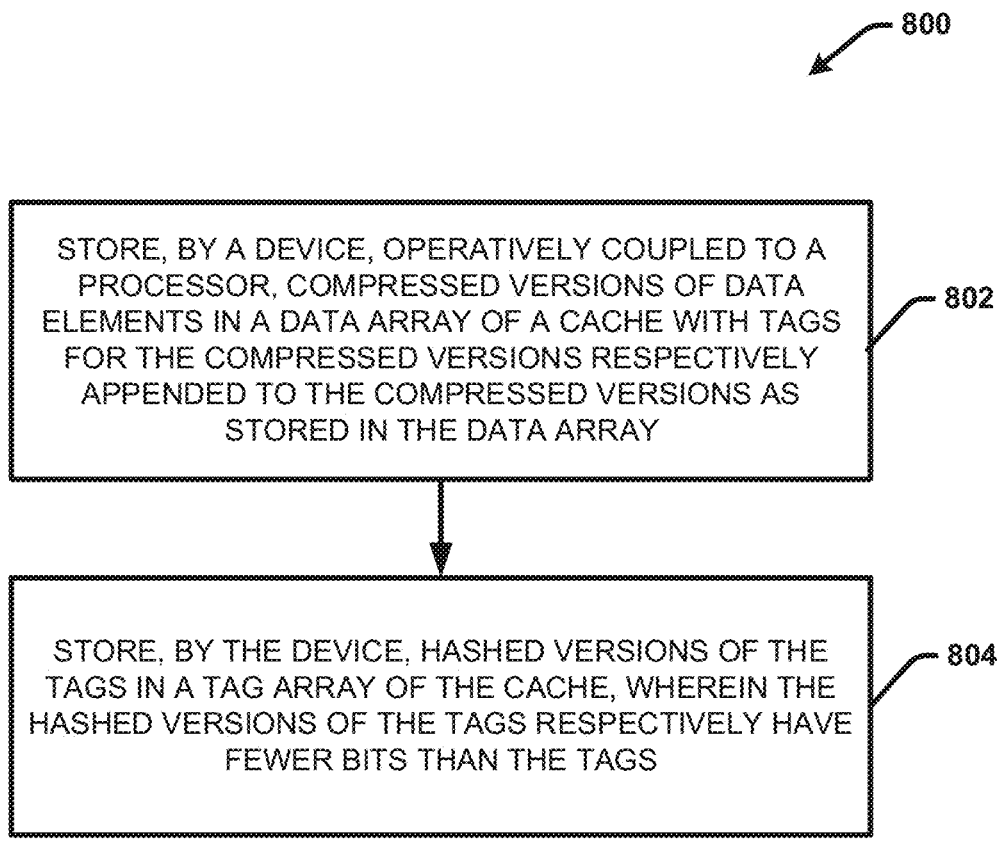
FIG. 8 provides a high-level flow diagram of an example computer-implemented process for using multi-tag storage to enable efficient data compression in caches in accordance with one or more embodiments of the disclosed subject matter.

FIG. 8 provides a high-level flow diagram of an example computer-implemented process 800 for using multi-tag storage to enable efficient data compression in caches in accordance with one or more embodiments of the disclosed subject matter. Repetitive description of like elements employed in respective embodiments is omitted for sake of brevity.

At 802, a device operatively coupled to a processor (e.g., computing device 500) can store compressed versions of data elements in a data array of a cache with tags for the compressed versions respectively appended to the compressed versions as stored in the data array (e.g., using the cache-write component 404). At 804, the device can store hashed versions of the tags in a tag array of the cache, wherein the hashed versions of the tags respectively have fewer bits than the tags (e.g., using the cache-write component 404).

Figure 9:
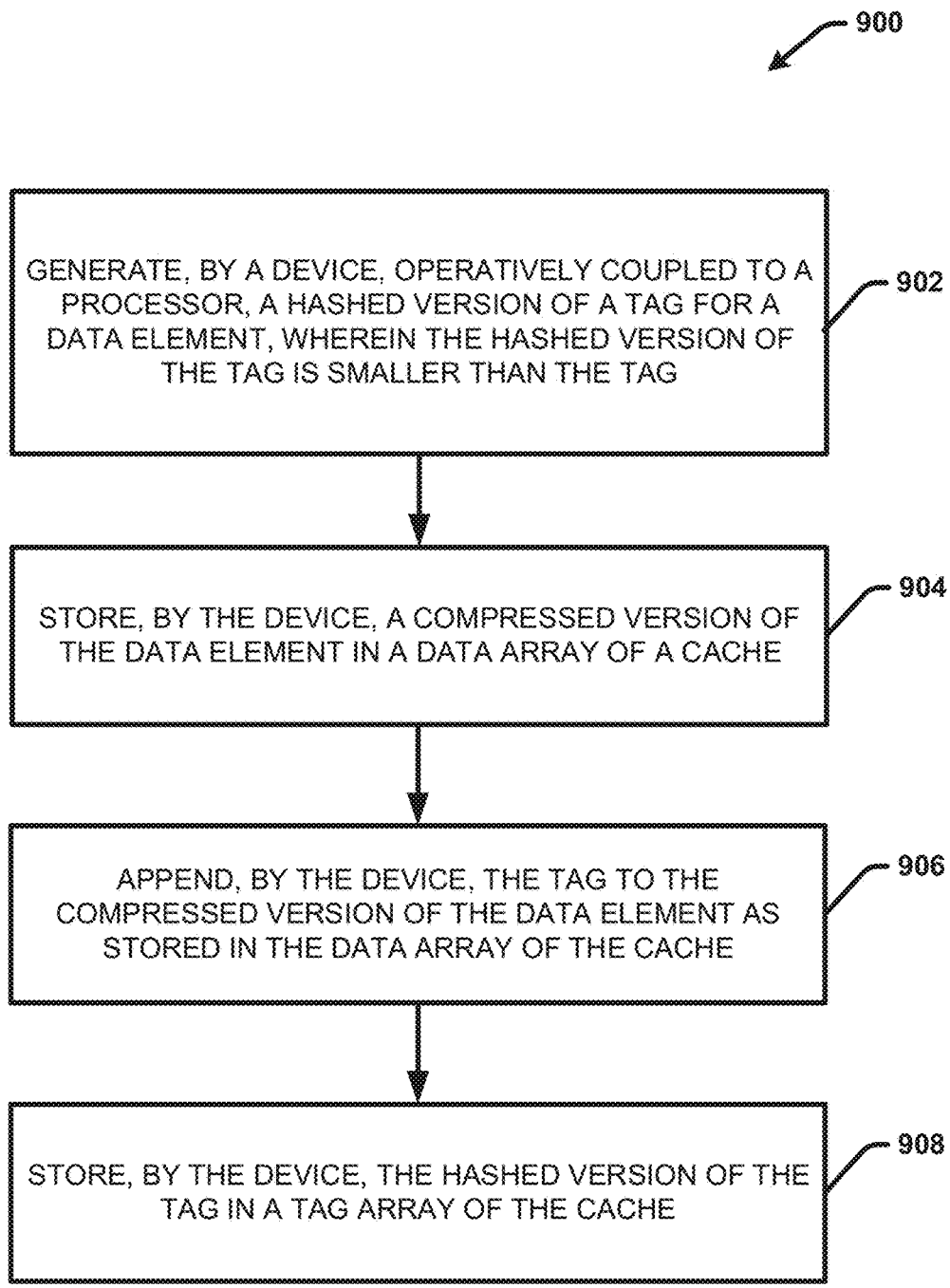
FIG. 9 a high-level flow diagram of another example computer-implemented process for using multi-tag storage to enable efficient data compression in caches in accordance with one or more embodiments of the disclosed subject matter.

FIG. 9 a high-level flow diagram of another example computer-implemented process 900 for using multi-tag storage to enable efficient data compression in caches in accordance with one or more embodiments of the disclosed subject matter. Repetitive description of like elements employed in respective embodiments is omitted for sake of brevity.

At 902, a device operatively coupled to a processor (e.g., computing device 500) can generate a hashed version of a tag for a data element (e.g., using tag hashing component 408), wherein the hashed version of the tag is smaller than the tag. At 904, the device can store a compressed version of the data element in a data array of a cache (e.g., using cache-write component 404). At 906, the device can further append the tag to the compressed version of the data element as stored in the data array of the cache (e.g., using cache-write component 404). At 908, the device can further store the hashed version of the tag in a tag array of the cache (e.g., using the cache-write component 404).

Figure 10:
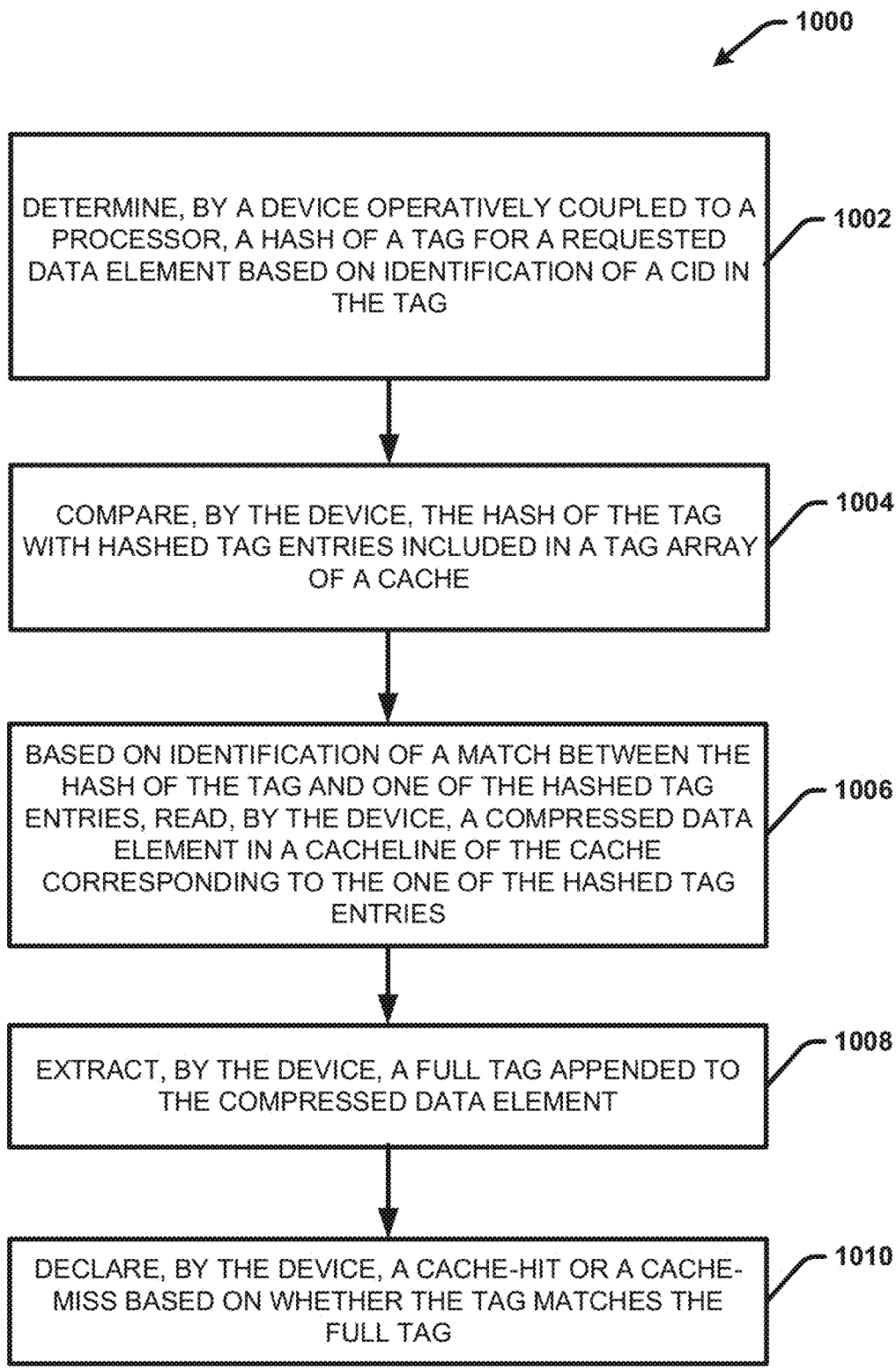
FIG. 10 a high-level flow diagram of yet another example computer-implemented process for using multi-tag storage to enable efficient data compression in caches in accordance with one or more embodiments of the disclosed subject matter.

FIG. 10 a high-level flow diagram of another example computer-implemented process 1000 for using multi-tag storage to enable efficient data compression in caches in accordance with one or more embodiments of the disclosed subject matter. Repetitive description of like elements employed in respective embodiments is omitted for sake of brevity.

At 1002, a device operatively coupled to a processor (e.g., computing device 500), determines a hash of a tag for a requested data element based on identification of a CID in the tag (e.g., using the tag hashing component 408). At 1004, the device compares the hash of the tag with hashed tag entries included in a tag array of a cache (e.g., using the tag checker component 410). At 1006, based on identification of a match between the hash of the tag and one of the hashed tag entries, the device reads a compressed data element in a cacheline of the cache corresponding to the one of the hashed tag entries (e.g., using the cache-read component 406). At 1008, the device extracts a full tag appended to the compressed data element (e.g., using the cache-read component 406). At 1010, the device declares a cache-hit or a cache-miss based on whether the tag matches the full tag (e.g., using the cache-read component).

One or more embodiments can be a system, a method, and/or a computer program product implemented, for example, as described below. The computer program product can include a computer readable storage medium (or media) having computer readable program instructions thereon for causing a processor to carry out one or more aspects of the present embodiments.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the entity's computer, partly on the entity's computer, as a stand-alone software package, partly on the entity's computer and partly on a remote computer or entirely on the remote computer or server. In the latter scenario, the remote computer can be connected to the entity's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGAs), or programmable logic arrays (PLAs) can execute the computer readable program instructions by utilizing state information of the computer readable program instructions to personalize the electronic circuitry, in order to implement one or more embodiments of the present invention.

Aspects of the present invention are described herein with reference to flowchart illustrations and/or block diagrams of methods, apparatus (systems), and computer program products according to embodiments of the invention. It can be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, implement the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement the functions/acts specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession may, in fact, be executed substantially concurrently, or the blocks can sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

In connection with FIG. 11, the systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders, not all of which are explicitly illustrated herein.

Figure 11:
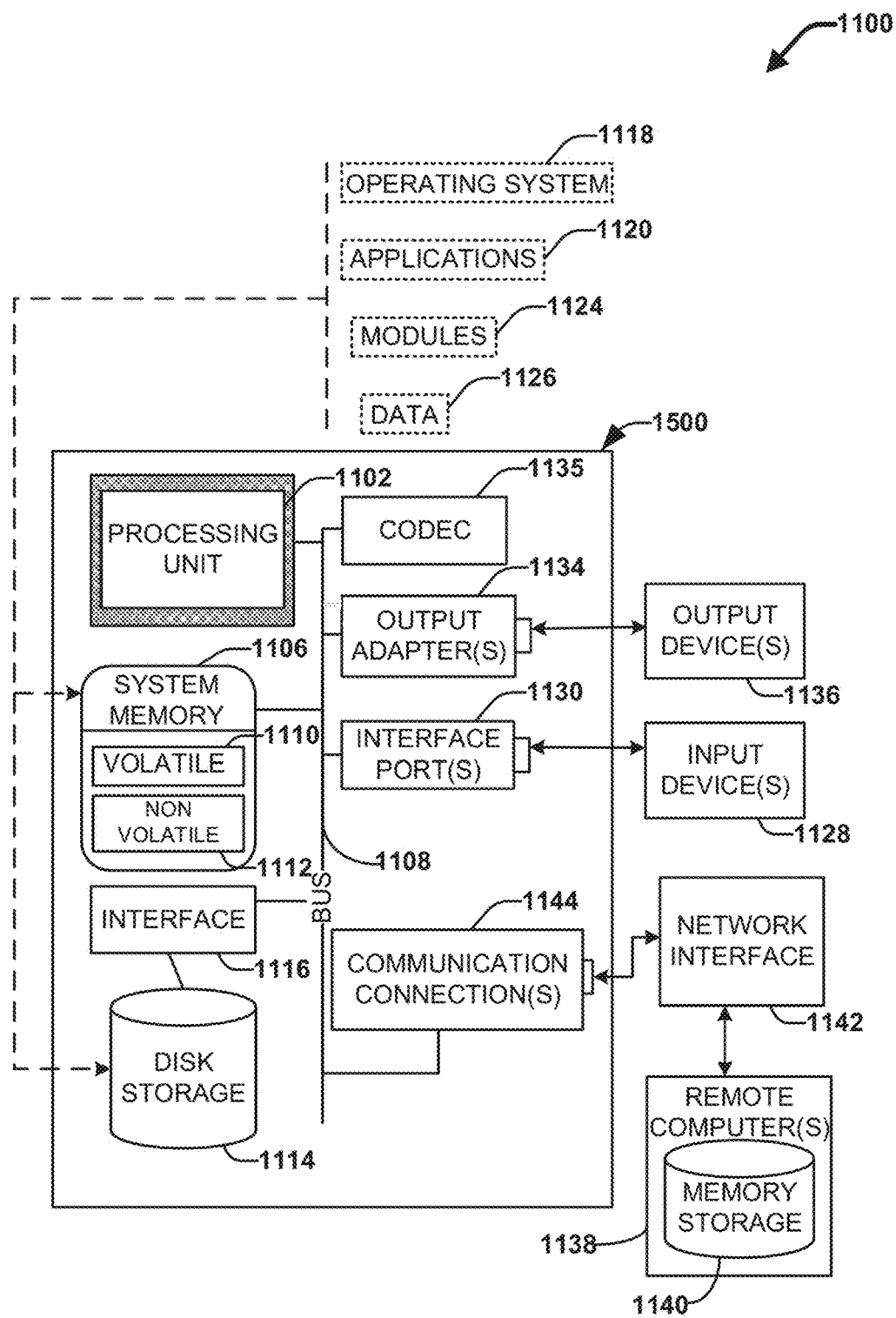
FIG. 11 illustrates a block diagram of an example, non-limiting operating environment including a computer in which one or more embodiments described herein can be facilitated.

With reference to FIG. 11, an example environment 1100 for implementing various aspects of the claimed subject matter includes a computer 1500. The computer 1500 includes a processing unit 1102, a system memory 1106, a codec 1135, and a system bus 1108. The system bus 1108 couples system components, including but not limited to the system memory 1106, to the processing unit 1102. The processing unit 1102 can be any of various available processors. Dual microprocessors and other multiprocessor architectures also can be employed as the processing unit 1102.

The system bus 1108 can be any of several types of bus structure(s) including a memory bus, a peripheral bus or external bus, or a local bus using any variety of available bus architectures including, but not limited to, Industry Standard Architecture (ISA), Micro-Channel Architecture (MSA), Extended ISA (EISA), Integrated Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association (PCMCIA) bus, Firewire® (IEEE 13114), and Small Computer Systems Interface (SCSI).

The system memory 1106 includes volatile memory 1110 and non-volatile memory 1112, which can employ one or more of the disclosed memory architectures, in various embodiments. The basic input/output system (BIOS), containing the basic routines to transfer information between elements within the computer 1500, such as during start-up, is stored in non-volatile memory 1112. In addition, according to present innovations, codec 1135 can include at least one of an encoder or decoder, wherein the at least one of an encoder or decoder can consist of hardware, software, or a combination of hardware and software. Although, codec 1135 is depicted as a separate component, codec 1135 can be contained within non-volatile memory 1112. By way of illustration, and not limitation, non-volatile memory 1112 can include read only memory (ROM), programmable ROM (PROM), electrically programmable ROM (EPROM), electrically erasable programmable ROM (EEPROM), Flash memory, three-dimensional (3D) Flash memory, or resistive memory such as resistive random access memory (RRAM). Non-volatile memory 1112 can employ one or more of the disclosed memory devices, in at least some embodiments. Moreover, non-volatile memory 1112 can be computer memory (e.g., physically integrated with computer 1500 or a mainboard thereof), or removable memory. Examples of suitable removable memory, with which disclosed embodiments can be implemented, include a Secure Digital (SD)™ card, a CompactFlash® (CF) card, a universal serial bus (USB) memory stick, or the like. Volatile memory 1110 includes random access memory (RAM), which acts as external cache memory, and can also employ one or more disclosed memory devices in various embodiments. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM) and so forth.

Computer 1500 can also include a removable/non-removable, volatile/non-volatile computer storage medium. FIG. 11 illustrates, for example, disk storage 1114. Disk storage 1114 includes, but is not limited to, devices like a magnetic disk drive, solid state disk (SSD), flash memory card, or memory stick. In addition, disk storage 1114 can include a storage medium separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1114 to the system bus 1108, a removable or non-removable interface is typically used, such as interface 1116. It should be appreciated that disk storage 1114 can store information related to an entity. Such information might be stored at or provided to a server or to an application running on an entity device. In one embodiment, the entity can be notified (e.g., by way of output device(s) 1136) of the types of information that are stored to disk storage 1114 or transmitted to the server or application. The entity can be provided the opportunity to opt-in or opt-out of having such information collected or shared with the server or application (e.g., by way of input from input device(s) 1128).

It should be appreciated that FIG. 11 shows software that acts as an intermediary between entities and the basic computer resources described in the suitable operating environment 1100. Such software includes an operating system 1118. Operating system 1118, which can be stored on disk storage 1114, acts to control and allocate resources of the computer 1500. Applications 1120 take advantage of the management of resources by operating system 1118 through program modules 1124, and program data 1126, such as the boot/shutdown transaction table and the like, stored either in system memory 1106 or on disk storage 1114. It should be appreciated that the claimed subject matter can be implemented with various operating systems or combinations of operating systems.

An entity enters commands or information into the computer 1500 through input device(s) 1128. Input devices 1128 include, but are not limited to, a pointing device such as a mouse, trackball, stylus, touch pad, keyboard, microphone, joystick, game pad, satellite dish, scanner, television (TV) tuner card, digital camera, digital video camera, web camera, and the like. These and other input devices connect to the processing unit 1102 through the system bus 1108 via interface port(s) 1130. Interface port(s) 1130 include, for example, a serial port, a parallel port, a game port, and a universal serial bus (USB) port. Output device(s) 1136 use some of the same type of ports as input device(s) 1128. Thus, for example, a USB port can be used to provide input to computer 1500 and to output information from computer 1500 to an output device 1136. Output adapter(s) 1134 is provided to illustrate that there are some output devices 1136 like monitors, speakers, and printers, among other output devices 1136, which require special adapters. The output adapter(s) 1134 include, by way of illustration and not limitation, video and sound cards that provide a means of connection between the output device 1136 and the system bus 1108. It should be noted that other devices or systems of devices provide both input and output capabilities such as remote computer(s) 1138.

Computer 1500 can operate in a networked environment using logical connections to one or more remote computers, such as remote computer(s) 1138. The remote computer(s) 1138 can be a personal computer (PC), a server, a router, a network PC, a workstation, a microprocessor based appliance, a peer device, a smart phone, a tablet, or other network node, and typically includes many of the elements described relative to computer 1500. For purposes of brevity, only a memory storage device 1140 is illustrated with remote computer(s) 1138. Remote computer(s) 1138 is logically connected to computer 1500 through a network interface 1142 and then connected via communication connection(s) 1144. Network interface 1142 encompasses wired or wireless communication networks such as local-area networks (LANs) and wide-area networks (WANs) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSLs).

Communication connection(s) 1144 refers to the hardware/software employed to connect the network interface 1142 to the system bus 1108. While communication connection 1144 is shown for illustrative clarity inside computer 1500, it can also be external to computer 1500. The hardware/software necessary for connection to the network interface 1142 includes, for exemplary purposes only, internal and external technologies such as, modems including regular telephone grade modems, cable modems and DSL modems, ISDN adapters, and wired and wireless Ethernet cards, hubs, and routers.

While the subject matter has been described above in the general context of computer-executable instructions of a computer program product that runs on a computer and/or computers, those skilled in the art will recognize that this disclosure also can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., a personal digital assistant (PDA), phone), microprocessor-based or programmable consumer or industrial electronics, and the like. The illustrated embodiments can also be practiced in distributed computing environments where tasks are performed by remote processing devices that are linked through a communications network. However, some, if not all embodiments of this disclosure can be practiced on stand-alone computers. In a distributed computing environment, program modules can be located in both local and remote memory storage devices.

As used in this application, the terms "component," "system," "platform," "interface," and the like, in a non-limiting example, refer to and/or include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In one or more embodiments, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, the articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration and are intended to be non-limiting. For the avoidance of doubt, the subject matter disclosed herein is not limited by such examples. In addition, any design described herein as an "example" and/or "exemplary" is not necessarily to be construed as preferred or advantageous over other designs, nor is it meant to preclude equivalent exemplary structures and techniques known to those of ordinary skill in the art.

As it is employed in the subject specification, the term "processor refers to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor refers to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of entity equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It should be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchronous link DRAM (SLDRAM), direct Rambus® RAM (DRRAM), direct Rambus® dynamic RAM (DRDRAM), and Rambus® dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
a memory that stores computer executable components;
a processor that executes the computer executable components stored in the memory, wherein the computer executable components comprise:
a tag hashing component that generates a hashed version of a tag for a data element, wherein the hashed version of the tag is smaller than the tag; and
a cache-write component that stores a compressed version of the data element in a data array of a cache, wherein the cache-write component further appends the tag to the compressed version of the data element as stored in the data array of the cache and stores the hashed version of the tag in a tag array of the cache.

2. The system of claim 1, wherein the cache-write component stores the compressed version of the data element in a cacheline of the data array and wherein the cacheline further comprises a second compressed version of a second data element.

3. The system of claim 2, wherein the cache-write component stores the hashed version of the tag in a tag block of the tag array and wherein the tag block further comprises a second hashed version of a second tag for the second data element, wherein the second hashed version of the second tag is smaller than the second tag.

4. The system of claim 1, wherein the tag array of the cache comprises a plurality of hashed versions of tags for a plurality of compressed versions of data elements stored in the data array of the cache, and wherein the tags are respectively appended to the compressed versions of the data elements as stored in the data array of the cache.

5. The system of claim 1, wherein the computer executable components further comprise:
a cache-read component that, in association with reading compressed data from the cache, determines hashed versions of tags and compares the hashed versions of the tags with hashed tag entries in the tag array.

6. The system of claim 5, wherein in association with reading the compressed data from the cache, the cache-read component further compares the hashed tag entries with corresponding full versions of the tags respectively appended to compressed versions of data elements as stored in the data array, thereby preventing false positive cache reads based on the hashed versions of the tags.

7. The system of claim 1, wherein the cache-write component further inserts a compressed identifier into the tag and stores the compressed identifier with the hashed version of the tag in the tag array, and wherein the compressed identifier comprises a defined number of first bits and defined values for the bits of the tag.

8. The system of claim 1, wherein the cache-write component stores full versions of tags in the tag array for decompressed data stored in the data array of the cache.

9. The system of claim 1, wherein the computer executable components further comprise:
a cache-read component that, in association with reading compressed data from the cache, determines whether a cacheline of the cache comprises compressed data or decompressed data based on whether a corresponding tag block of the tag array comprises a compressed line identifier.

10. The system of claim 1, wherein a storage capacity of the cache is increased based on storage of the compressed version of the data element in the data array of the cache as opposed to an uncompressed version of the data element.

11. The system of claim 1, wherein the cache-write component stores the hashed version of the tag in the tag array of the cache and stores the compressed version of the data element in the data array of the cache based on a first determination that the data element is a candidate for compression and a second determination that a cacheline for storing the data element comprises existing data.

12. A computer implemented method, comprising:
storing, by a processor of a device, compressed versions of data elements in a data array of a cache with tags for the compressed versions of data elements respectively appended to the compressed versions of data elements as stored in the data array; and
storing, by the processor, hashed versions of the tags in a tag array of the cache, wherein the hashed versions of the tags respectively have fewer bits than the tags.

13. The computer implemented method of claim 12, wherein the storing of the compressed versions of data elements comprises storing two or more first compressed versions of the compressed versions of data elements in a single cacheline of the data array with first tags of the tags respectively appended to the two or more first compressed versions of data elements, and wherein the storing of the hashed versions of the tags comprises storing two or more hashed versions of the first tags in a single tag block that corresponds to the single cacheline.

14. The computer implemented method of claim 12, further comprising:
inserting, by the processor, compressed identifiers into the tags appended to the compressed versions of data elements as stored in the data array; and
storing, by the processor, the compressed identifiers in tag blocks of the tag array comprising two or more of the hashed versions of the tags.

15. The computer implemented method of claim 12, wherein the data elements comprise first data elements, wherein the tags comprise first tags, and wherein the method further comprises:
storing, by the processor, decompressed versions of second data elements in the data array; and
storing, by the processor, second tags for the decompressed versions of the data elements in the tag array.

16. The computer implemented method of claim 12, further comprising:
reading, by the processor, data from the cache, wherein the reading comprises:
determining, by the processor, whether a cacheline of the cache comprises compressed or decompressed data based on whether a tag block for the cacheline comprises a compressed identifier.

17. The computer implemented method of claim 12, further comprising:
reading, by the processor, compressed data from the cache, wherein the reading comprises:
comparing, by the processor, a hash of a current tag for a data element with the hashed versions of the tags in the tag array.

18. The computer implemented method of claim 17, wherein the reading further comprises:
based on a determination that the hash of the current tag matches a hashed version of the hashed versions of the tags in the tag array:
reading, by the processor, a stored data element stored in the data array that corresponds to the matching hashed version;
extracting, by the processor, a full tag appended to the stored data element as stored in the data array; and
determining, by the processor, a cache-hit or a cache-miss based on whether the current tag matches the full tag.

19. A computer program product for storing compressed data in a cache without modifying a tag array of the cache, the computer program product comprising a computer readable storage medium having program instructions embodied therewith, the program instructions executable by a processing component to cause the processing component to:
store compressed versions of data elements in a data array of a cache with tags for the compressed versions of the data elements respectively appended to the compressed versions of the data elements as stored in the data array; and
store hashed versions of the tags in a tag array of the cache, wherein the hashed versions of the tags respectively have fewer bits than the tags.

20. The computer program product of claim 19, wherein the program instructions further cause the processing component to:
Stores compressed identifiers in tag blocks of the tag array comprising two or more of the hashed versions of the tags; and
Determine whether a cacheline of the cache comprises compressed or decompressed data based on whether a tag block for the cacheline comprises a compressed identifier.

* * * * *